United States Patent Office 3,511,620
Patented May 12, 1970

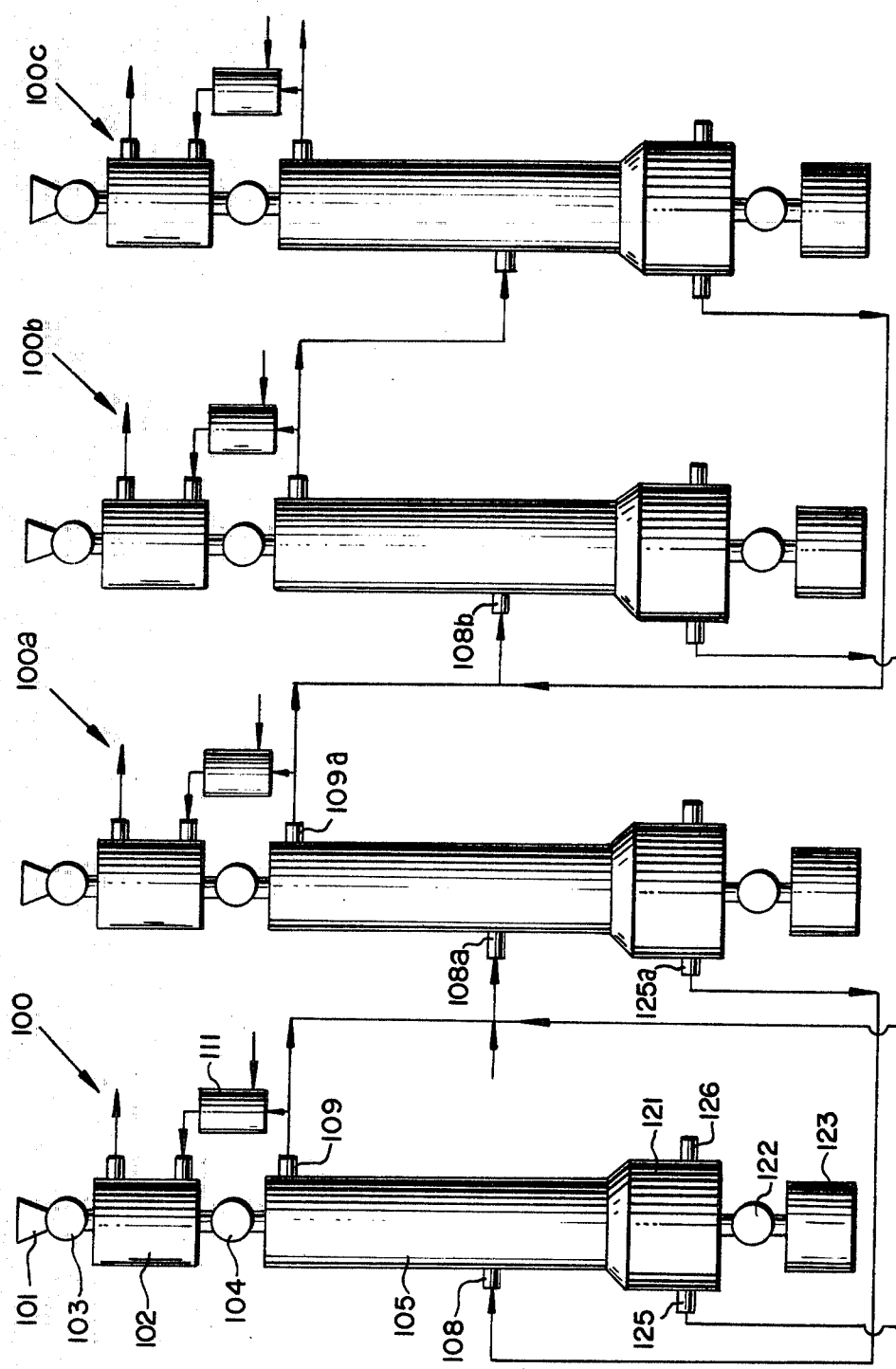

3,511,620
ION EXCHANGE METHOD FOR SEPARATING URANIUM ISOTOPES
Junichi Shimokawa, 766 Oaza Funaishikawa; Gunji Nishio, 945 Oaza Muramatsu; and Fumiaki Kobayashi, 1228 Oaza Muramatsu, all of Tokai-mura, Naka-gun, Ibaraki-ken, Japan
Continuation-in-part of application Ser. No. 473,692, July 21, 1965. This application Nov. 21, 1967, Ser. No. 684,711
Claims priority, application Japan, July 30, 1964, 39/42,907
Int. Cl. C01g 43/00
U.S. Cl. 23—338      3 Claims

ABSTRACT OF THE DISCLOSURE

A cation exchange resin carrying adsorbed cations of quadrivalent uranium is contacted with an acid solution of hexavalent uranium cations having an acidity not substantially above 1 N. Shortly thereafter, a higher proportion of $U^{235}$ is found in the dissolved uranium than in the adsorbed uranium, the ratio being 1.0007:1 at isotope equilibrium. Natural uranium is thus separated into fractions respectively enriched with, and depleted of, $U^{235}$ by countercurrent flow of resin and solution in multiple stages.

REFERENCE TO RELATED APPLICATION

This application is a continuation-in-part of our copending application Ser. No. 473,692, filed July 21, 1965 now abandoned.

BACKGROUND OF THE INVENTION

This invention relates to the separation of uranium isotopes, and particularly to the separation of $U^{235}$ from $U^{238}$.

The separation of the fissionable isotope $U^{235}$ from natural uranium, mainly consisting of $U^{238}$, could be performed economically heretofore only by a gas diffusion process which requires elaborate equipment. Other methods of at least partly separating the isotopes so as to produce a fraction enriched with $U^{235}$ have been devised, but have been useful so far only on a laboratory scale or where practically unnlimited funds were available.

The object of the invention is the provision of a method which permits separation of uranium isotopes to produce a uranium fraction enriched with $U^{235}$, which can be carried out successfully with relatively simple equipment constructed and operated with limited economic means.

SUMMARY OF THE INVENTION

Our invention is based in part on the fact that cations containing quadrivalent uranium are so firmly bound by cation exchange resins that no quadrivalent uranium passes from the resin into a solution of hexavalent uranium which is in direct contact with the $U^{IV}$ bearing resin, but that hexavalent uranium is taken up by the resin from the solution if the latter is acid, but has a pH not substantially smaller than 1.0.

It has been found that an isotope exchange or a valence exchange reaction rapidly takes place on the resin between the adsorbed quadrivalent and hexavalent uranium:

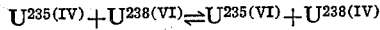

The reaction reaches equilibrium when the concentration of $U^{235}$ in the adsorbed hexavalent uranium, that is, $U^{235(VI)}$, reaches a value greater by a factor of 1.0007 than the $U^{235}$ concentration in the quadrivalent uranium.

It has additionally been established that isotope equilibrium between the hexavalent uranium in the solution and on the resin is achieved extremely quickly, and much faster than the afore-discussed valence equilibrium. The equilibrium concentration of $U^{235}$ is the same in the dissolved and the adsorbed $U^{VI}$.

When a cation exchange resin carrying cations of quadrivalent uranium is brought into contact with a mildly acid solution of cations of hexavalent uranium which is substantially free of the quadrivalent form, an equilibrium is established in such a manner that the uranium in the solution is enriched slightly with $U^{235}$ whereas the uranium on the resin is depleted correspondingly.

We have found that fractions enriched by more than a factor of 1.0007 are readily obtained by reducing the enriched $U^{VI}$ to the quadrivalent form, charging a cation exchange resin with the enriched $U^{IV}$, and contacting the charged resin with a solution of $U^{VI}$ prepared from natural uranium. When equilibrium in valence or isotope exchange is established in a process in which the resin and solution flow countercurrently in continuous streams, the last mentioned solution is enriched further than the first enriched solution, and relatively concentrated $U^{235}$ solutions can be obtained by repeating the outlined procedure in multiple stages, or by continuously returning the enriched material to the process in quadrivalent form until the desired result is achieved.

Other features, additional objects, and many of the attendant advantages of this invention will readily become apparent from the following detailed description of preferred embodiments when considered in connection with the attached drawing.

BRIEF DESCRIPTION OF THE DRAWING

In the drawing:
FIG. 3 shows another apparatus for the same purpose in a similar view.

DETAILED DESCRIPTION OF PREFERRED EMBODIMENTS

Figure 1:
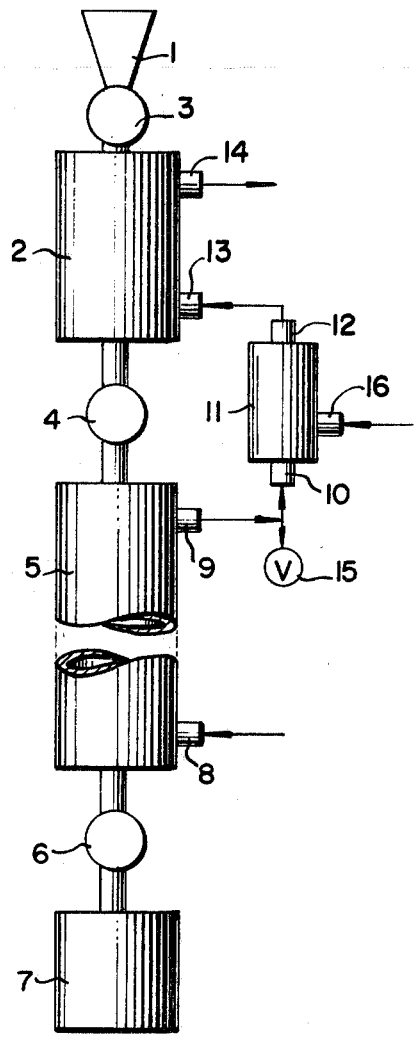
FIG. 1 shows apparatus for performing the method of the invention in an elevational, somewhat diagrammatic view.

Referring now to the drawing in detail, and initially to FIG. 1, there is seen a hopper 1 connected to the top of a first or charging column 2 by a rotary feeder 3. A rotary feeder 4 connects the bottom of the first column 2 to the top of a second or main column 5. A rotary feeder 6 at the bottom of the second column 5 discharges into a storage receptacle 7. A common drive, not shown, normally operates the three identical feeders 3, 4, 6 for transfer of solid material from the hopper 1 to the receptacle 7 at a constant and uniform rate.

The main column 5 has a liquid inlet 8 at its bottom, and a liquid outlet 9 at its top. The bottom inlet 10 of a third or reducing column 11 is connected to the outlet 9, and a top outlet 12 of the column 11 is connected with a bottom inlet 13 of the charging column 2. Waste liquid is discharged from a top outlet 14 of the charging column 2.

A valve 15 on the line connecting the outlet 9 and the inlet 10 permits a sample of the liquid discharged from the main column 5 to be drawn. The reducing column 11 is provided with a reagent inlet 16 near its bottom.

The operation of the apparatus of FIG. 1 is illustrated by the following example.

EXAMPLE 1

A granular cation exchange resin in the hydrogen form (Dowex 50 X 4, 20–50 mesh ASTM) was fed from the hopper 1 through the columns 2, 5 to the receptacle 7, keeping the columns 2, 5 substantially packed at all times. The reducing column 11 was packed with fine zinc granules (50 mesh ASTM) thinly coated with mercury. A 0.1 molar solution of uranyl chloride having a pH of 0.8 was fed to the inlet 8 of the main column 5, and dilute hydrochloric acid was fed to the inlet 16 of the reducing column 11.

The $U^{VI}$ solution passed upwardly through the main column 5 into the reducing column 11 where its uranium content was reduced to the quadrivalent state by the zinc amalgam and hydrochloric acid. The resulting solution of hydrogen, zinc, $U^{IV}$ and chloride ions passed upwardly through the charging column 2 in which the $U^{IV}$ ions were preferentially adsorbed on the descending resin, and a solution containing zinc ions and the ions of hydrochloric acid was discharged through the outlet 14.

The resin charged with $U^{IV}$ passed through the main column 5 countercurrently to the ascending $U^{VI}$ solution, and was discharged through the feeder 6 into the receptacle 7. The amount of liquid passing through the feeders 4 and 6 with the resin was insignificant.

In an actual embodiment, the main column 5 was 10 meters high and had a diameter of 1.5 cm. The reducing column 11 had a height of 30 cm. and a diameter of 1.5 cm., the zinc amalgam layer having a length of 20 cm. The charging column 2 had a height of 50 cm. and a diameter of 4 cm., and the receptacle 7 was a cylinder 50 cm. high and 30 cm. in diameter.

The resin moved downwardly at 3.5 cm.³/hr. while the 0.1 molar solution of $U^{VI}$ was supplied under pressure at a rate of 10 cm.³/hr. The feeders made six turns per hour. The recovered resin contained 0.312 mol $U^{IV}$ and 0.223 mol $U^{VI}$ per liter.

The apparatus was operated continuously for an extended period, and samples drawn from the valve 15 were analyzed for isotope concentration (ratio $U^{235}$:$U^{238}$) from time to time with the following results:

| Days after starting | Ratio $U^{235}$:$U^{238}$, percent |
| --- | --- |
| 0 | 0.719±0.003 |
| 25 | 0.723±0.0025 |
| 50 | 0.727±0.0025 |
| 75 | 0.730±0.0025 |

In a single pass, the $U^{235}$ content of the $U^{VI}$ solution was increased by a factor K of 1.0007 over the $U^{235}$ content of the $U^{IV}$ in the resin.

Figure 2:
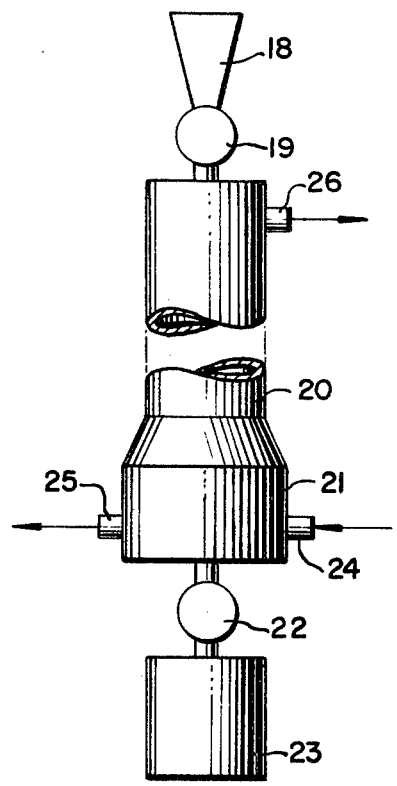
FIG. 2 illustrates another apparatus for performing the method of the invention in a view corresponding to that of FIG. 1.

In the apparatus illustrated in FIG. 2, a hopper 18 is connected by a feeder 19 to the top of a column 20 having an enlarged bottom section 21. A feeder 22 leads downwardly from the section 21 into a receptacle 23. An inlet 24 and an outlet 25 for liquid are provided in circumferentially spaced relationship on the section 21, and a liquid outlet 26 is provided near the top of the column 20.

The following example illustrates the operation of the apparatus of FIG. 2:

EXAMPLE 2

A solution of quadrivalent uranium was prepared by heating powdered uranium oxide ($U_3O_8$) in one section of quartz tube to 650–700° C., and contacting the hot material with carbon tetrachloride. The resulting vapors of uranium tetrachloride were condensed on a cold wall portion of another section of the tube to form a crystalline deposit. An inert atmosphere of nitrogen and argon was maintained in the tube.

The collected uranium tetrachloride was dissolved in water and hydrochloric acid, and Dowex 50 in the hydrogen form was soaked in the solution. The $U^{IV}$-bearing resin was fed to the column 20 from the bin 18, and was discharged from the bottom section 21 into the receptacle 23. Aqueous solutions of hydrogen peroxide and hydrochloric acid were admitted to the bottom section through the inlet 24 at such a rate that the $U^{IV}$ was stripped practically completely from the resin in the form of hexavalent uranium. A portion of the solution was withdrawn from the outlet 25 in the section 21, and the remainder was permitted to reach isotope equilibrium with the $U^{IV}$ in the descending resin, and was withdrawn from the outlet 26.

In an actual embodiment, the column 20 had a total height of 10 m. Its bottom section 21 was 0.5 m. high and had a diameter of 5 cm., whereas the remainder of the column had a diameter of 1.5 cm. The receptacle 23 was 50 cm. high and 30 cm. in diameter. The feeders 19, 22 rotated in unison 6 times per hour to pass the resin through the column at a rate of 5.8 cm.³/hr.

The hydrogen peroxide solution had a concentration of 0.3 mol per liter and was fed to the inlet 24 at a rate of 10 cm.³/hr. The hydrochloric acid solution was 0.6 normal and was supplied at a rate of 10 cm.³/hr.

The resin discharged from the column contained 0.306 mol $U^{IV}$ and 0.212 mol $U^{VI}$ per liter. The liquid in the column contained 0.3 ml./l. $U^{VI}$, was practically free of $U^{IV}$, and had an acidity of 0.5 N.

The apparatus of FIG. 2 was operated for an extended period under the conditions outlined above, and the ratio of $U^{235}$:$U^{238}$ in the hexavalent uranium withdrawn from the outlet 25 of the bottom section 21 decreased gradually, as follows:

| Days after starting | Ratio $U^{235}$:$U^{238}$, percent |
| --- | --- |
| 0 | 0.719±0.003 |
| 20 | 0.717±0.0025 |
| 40 | 0.714±0.0025 |
| 60 | 0.711±0.0025 |

Substantially the same results were obtained when Dowex 50 was replaced by other cation exchange resins including Daiaion SK–1 and Amberlite IR120 in the operation of the two types of apparatus shown in FIGS. 1 and 2.

The multi-stage apparatus illustrated in FIG. 3 consists of substantially identical units 100, 100a, 100b, 100c, etc. of which only the first four are seen in the drawing. Each unit combines the essential feature and functions of the devices described above with reference to FIGS. 1 and 2, and corresponding elements have been provided in FIG. 3 with the reference numerals of FIGS. 1 and 2, augmented by 100.

The unit 100 thus has a resin hopper 101 downwardly connected to a charging column 102 by a feeder 103. A feeder 104 connects the bottom of the column 102 to the top of a column 105. A $U^{VI}$ solution is fed to an inlet 108 in mid-height of the column 105 and is partly passed from the top outlet 109 of the column through a reducing column 111 containing zinc amalgam and supplied with hydrochloric acid as described with reference to FIG. 1. The $U^{IV}$ solution thus prepared is led to the charging column 102 from which a waste liquor containing mainly zinc and hydrogen chlorides is discharged. The upper portion of the unit 100 thus is closely similar to the apparatus described with reference to FIG. 1.

The $U^{VI}$ solution partly withdrawn from the top outlet 109 of the column is enriched with $U^{235}$ as compared to the $U^{VI}$ solution received through the inlet 108, and the resin carrying both quadri- and hexavalent uranium downwardly from the inlet 108 is correspondingly depleted of its original $U^{235}$ content. It drops into the bottom portion 121 of the column, where it is regenerated by means of hydrogen peroxide and hydrochloric acid admitted through an inlet 126 as described with reference to FIG. 2. The $U^{VI}$ solution so produced is relatively low in $U^{235}$. It is partly withdrawn through an outlet 125, and partly rises in the column 105 for enrichment by exchange with the uranium carried by the desceding resin.

The regenerated resin is discharged through a feeder 122 to a receptacle 123, and is ready to be returned to the hopper 101. The $U^{VI}$ value fed to the liquid inlet 108 is, in effect, divided into a fraction enriched with $U^{235}$ and discharged from the outlet 109, and a depleted fraction of reduced $U^{235}$ content withdrawn from the system through the outlet 125. The several other units 100a, 100b, 100c, etc. operate in the same manner. They are interconnected as follows:

An original $U^{VI}$ solution which may be prepared from naturally occurring uranium in a conventional manner is fed to the inlet 108a of the second unit 100a. The enriched fraction discharged from the outlet 109a is fed to the inlet 108b of the third unit 100b. The depleted fraction discharged from the outlet 125a of the second unit 100a provides the feed supplied to the inlet 108 of the first unit 100. The uranium fraction discharged from the outlet 109 of the first unit 100 is restored approximately to the $U^{235}$ level of the original $U^{VI}$ solution so that it may be fed to the inlet 108a of the second unit 100a which also receives the depleted fraction from the third unit 100b, also approximately equal in $U^{235}$ level to the original solution.

Starting with the third unit 100b, the inlet 108b and the corresponding inlets of the subsequent units each receive the enriched fraction of the preceding unit, and all but the last also receive the depleted fraction of the following unit. The concentration of $U^{235}$ in the enriched uranium fraction increases from unit to unit, and the ultimate $U^{235}$ enrichment achieved is an exponential function of the number of units employed, while the volume of the solution to be transferred to the next column decreases in arithmetic progression.

The uranium solution discharged through the outlet 125 of the first unit still contains $U^{235}$ although it is depleted. Additional columns may be provided ahead of the unit 100 for recovering the $U^{235}$ from the depleted uranium solution.

The manner in which the material introduced through the inlet 108 into the column 105 is divided into a fraction transferred to the unit 100a and a fraction discharged from the outlet 125 can be varied to some extent. If the position of the inlet 108 is shifted downward, the degree of enrichment in the column 105 increases, but the degree of depletion decreases. Therefore, the yield of enriched uranium is not substantially different. It is most convenient to arrange the inlet 108 at the mid-height of the column 105 and to transfer one-half of the volume introduced at the inlet 108 to the following unit 100a.

While the resin in the system shown in FIG. 3 moves by gravity, the liquid must be pumped, and its flow controlled by valves. Neither pumps nor valves have been shown in the drawing since they may be entirely conventional and arranged in a manner well known to those skilled in the art.

It is a common feature of the several embodiments of the invention described and illustrated above, that quadrivalent uranium is present therein solely as an adsorbed phase bound to a cationic exchange resin. While the resin carries also some hexavalent uranium under the operating conditions necessary for the method of the invention, that is, a solution not higher than one-normal in hydrogen ions, all uranium in the solution is in the hexavalent state. The isotope exchange takes place between the four- and six-valent uranium present on the resin at a very high rate toward an equilibrium state in which the $U^{235}$ content of the $U^{VI}$ is 1.0007 times the $U^{235}$ content of the $U^{IV}$. At equilibrium, the $U^{235}$ content of the $U^{VI}$ adsorbed on the resin is not measurably different from that of the $U^{VI}$ in the solution with which the resin is in contact, and isotope equilibrium between the $U^{VI}$ in the solution and on the resin is reached even more rapidly than that between the $U^{IV}$ and $U^{VI}$ on the resin.

The invention thus permits the preparation of uranium enriched with $U^{235}$ to be achieved in a relatively simple and inexpensive manner. Its principal advantages are the use of a heterogeneous system in which all quadrivalent uranium is in the solid phase and the liquid phase contains hexavalent uranium practically to the exclusion of quadrivalent uranium. This permits the isotope enrichment reaction to be performed in a countercurrent system.

While the invention has been described with particular reference to a system employing chlorides of uranium, it will be appreciated that the nature of the anion associated with a uranium-bearing cation in the method of the invention is not critical. The actual nature of the uranium-bearing cation also is not important, and is not even fully known at this time. In the acidity range downward from approximately 1 N., in which uranium can be present as a cation dissolved in an aqueous liquid, hexavalent uranium appears to form uranyl ions ($UO_2++$). The cations of quadrivalent uranium adsorbed on a cation exchange resin in the method of the invention have not been identified with certainty, but there are indications that the uranium participating in the isotope exchange on the resin surface is in the in form of $U(OH)_3+$ ions. The nature of the actual ions present in the solution and on the resin is not important since the valence and isotope exchange which is basic to this invention does not involve chemical reactions in the conventional sense of the word.

Similar considerations apply to the reducing, oxidizing and eluting agents employed when the method of the invention is performed in countercurrent and/or multistage systems. Ferric chloride solution, for example, may be employed as a combined oxidizing agent and eluent for regenerating the uranium bearing resin, and many known reducing agents will readily suggest themselves to take the place of zinc amalgam and hydrochloric acid.

The equilibrium constant of the isotope exchange in the method of the invention is nearly constant, independent of temperature and not materially affected by the concentration of uranium bearing ions in the solution and on the resin. However, the concentration of said ions is limited by the adsorbing capacity of the resin used. Ambient temperature thus is satisfactory, though not critical, and concentrations may be chosen freely to suit specific operating conditions.

What is claimed is:

1. A method of separating uranium into fractions respectively enriched with $U^{235}$ and depleted of $U^{235}$ which comprises:
   (a) moving a first amount, a second amount, and a third amount of cation exchange resin having cations of quadrivalent uranium adsorbed thereon sequentially through respective first and second zones of a first column, a second column, and a third column respectively in a predetermined direction;
   (b) moving a first solution, a second solution, and a third solution of hexavalent uranium substantially free from quadrivalent uranium and having an acidity not substantially greater than 1-normal through said first, second, and third columns respectively,
      (1) a portion of each of said solutions being moved through the first zone of the respective column countercurrent to the corresponding resin moving therein, and
      (2) another portion of each of said solutions being moved through the second zone of the respective column in said predetermined direction;
   (c) contacting said first amount of resin with respective portions of said first solutions, said second amount of resin with respective portions of said second solution, and said third amount of resin with respective amounts of said third solution in said zones of said first, said second, and said third column respectively, each amount of resin being contacted in the respective zone with the corresponding solution until valence equilibrium between uranium ions in the quadrivalent and the hexavalent state is established on the resin, and isotope equilibrium between cations of hexavalent uranium on said resin and in the solution is established, whereby the solution remains substantially free from quadrivalent uranium;

(d) reducing the uranium cations in a part of each solution having been moved through the first zone of the associated column to the quadrivalent state;

(e) adsorbing the reduced cations on the corresponding amount of resin prior to the moving of the latter through the first zone of said associated column;

(f) feeding another part of the solutions having been moved through the first zones of said first and second columns to said second and third columns respectively to constitute parts of said second and third solutions;

(g) withdrawing another part of the solution having been moved through the first zone of said third column as a fraction enriched in $U^{235}$;

(h) feeding the solutions having been moved through the second zones of said second and third columns to said first and second solutions respectively; and (i) withdrawing the solution having been moved through the second zone of said first column as a fraction depleted of $U^{235}$.

2. A method of separating uranium into a fraction enriched with $U^{235}$ and a fraction depleted of $U^{235}$ which comprises:

(a) adsorbing cations of uranium in the quadrivalent state on a cation exchange resin;

(b) preparing an aqueous solution of cations of uranium in the hexavalent state, said solution having an acidity not substantially greater than 1-normal and being substantially free from cations of uranium in the quadrivalent state;

(c) moving said resin having said cations adsorbed thereon through an ion exchange zone in a predetermined direction while simultaneously moving said solution through said zone in a direction opposite to said predetermined direction;

(d) contacting said solution and said resin in said zone for a time sufficient to adsorb cations in said hexavalent state from said solution on said resin, to establish valence equilibrium between the adsorbed cations in the quadrivalent state and in the hexavalent state respectively, and to establish isotope equilibrium between cations of the hexavalent uranium in said solution and on said resin, while said solution remains practically free from cations of uranium in the quadrivalent state;

(e) thereafter separating the solution from said resin as an enriched uranium fraction;

(f) recovering the adsorbed uranium from said resin as a depleted uranium fraction in the state of solution in which uranium is hexavalent;

(g) reducing the cations of uranium in a portion of said separated solution from said hexavalent state thereof to the quadrivalent state;

(h) contacting said reduced cations with said resin prior to the moving of the latter through said zone; and (i) adding a portion of the solution recovered at step (f) to the solution of step (c).

3. A method as set forth in claim 2, wherein said adsorbed uranium is recovered from said resin by oxidizing the quadrivalent adsorbed uranium to the hexavalent state, and by eluting said oxidized uranium from the resin.

References Cited

Kakihana, Separation Factor of Uranium Isotopes Using Ion Exchanger, Nuclear Science Abstracts, 17–12578, Apr. 30, 1963.

Kakihana, Separation Factor of Uranium Isotopes, Nuclear Science Abstracts, 18–12528, Apr. 30, 1964.

CARL D. QUARFORTH, Primary Examiner

M. J. McGREAL, Assistant Examiner